(12) United States Patent
Prassas et al.

(10) Patent No.: US 6,253,486 B1
(45) Date of Patent: Jul. 3, 2001

(54) COMPOSITE LAWN EDGING

(75) Inventors: Thomas N. Prassas, Glendale; Shannon Bard, Scottsdale, both of AZ (US)

(73) Assignee: Aquapore Moisture Systems, Phoenix, AZ (US)

( * ) Notice: Subject to any disclaimer, the term of this patent is extended or adjusted under 35 U.S.C. 154(b) by 0 days.

(21) Appl. No.: 09/214,182

(22) PCT Filed: Aug. 8, 1997

(86) PCT No.: PCT/US97/14036

§ 371 Date: Dec. 29, 1998

§ 102(e) Date: Dec. 29, 1998

(87) PCT Pub. No.: WO98/06252

PCT Pub. Date: Feb. 19, 1998

Related U.S. Application Data

(60) Provisional application No. 60/023,775, filed on Aug. 9, 1996.

(51) Int. Cl.[7] .................................................... A01G 1/00
(52) U.S. Cl. ................................................................ 47/33
(58) Field of Search ................................. 47/33; 52/102; 264/173, 433, 446, 447, 448; 425/113, 463, 464, 467

(56) References Cited

U.S. PATENT DOCUMENTS

| | | | |
|---|---|---|---|
| 3,933,311 | * 1/1976 | Lemelson | 47/33 |
| 4,281,473 | * 8/1981 | Emalfarb et al. | 47/33 |
| 5,201,154 | * 4/1993 | Thomas | 47/33 |
| 5,242,644 | * 9/1993 | Thompson et al. | 425/464 |
| 5,252,644 | * 10/1993 | Edwards | 425/464 |
| 5,447,671 | * 9/1995 | Kato et al. | 264/433 |
| 5,456,045 | * 10/1995 | Bradley et al. | 47/33 |
| 5,519,970 | * 5/1996 | Reum et al. | 47/33 |

* cited by examiner

Primary Examiner—Peter M. Poon
Assistant Examiner—Elizabeth Shaw
(74) Attorney, Agent, or Firm—Marvin E. Jacobs

(57) ABSTRACT

The lawn edging (10) is formed by extruding a thermoplastic resin, preferably a thermoplastic resin such as polyethylene containing a dispersion of prevulcanized elastomer granules through a die (62) having a vertical die orifice (64) for forming the wall (12) of the channel (16). The vertical die orifice (64) also contains an element for forming protrusions (20) on a surface of the wall (12). The element preferably forms a horizontal edge on the protrusion (20). The feed rate of the element can be higher than the adjacent sections of the wall (12) such that the extruded material backs up in the die (62) and intermittently feeds through the outlet orifice (64). The channel (16) can contain a lower bead (34) and an upper hollow head member (14) which can be coated with a liquid impervious film (100) and perforated by a laser (120) to form spray apertures (122).

17 Claims, 3 Drawing Sheets

COMPOSITE LAWN EDGING

This application claims benefit to U.S. provisional application Ser. No. 60/023,775 filed Aug. 9, 1996.

TECHNICAL FIELD

This invention relates to a lawn barrier and more particularly this invention relates to an improved synthetic composite lawn edging which acts as a divider between lawn areas containing different types of plants or ground cover.

1. Background of the Invention

Many lawns are landscaped to contain discrete areas or beds of ground cover such as grass, plants or non-growing materials such as stone or bark. In order to prevent growth across the common border; it is quite common to install a physical barrier at the border such as strips of wood, metal, brick or cement walls, or lawn edging formed of synthetic resin.

2. Description of the Prior Art

A popular form of synthetic resin lawn edging is in the form of a flange having an enlarged tube and a pair of anchoring means such as upwardly facing lips are provided between the lips and bottom of the flange as disclosed in U.S. Pat. No. 4,281,473.

This lawn edging is formed from polyethylene. It is very rigid and inflexible. The edging is marketed in twenty foot sections wound into a coil. The edging retains the memory of the bends in the coil. It is hard to install in a straight line and the edging also contains vertical ribs intended to aid in securing the edging in the ground. The edging kinks when bent into a narrow radius. The memory combined with a very smooth surface causes the edging to work its way out of the ground even though it contains the upwardly facing lips on the flange which are backfilled with dirt or stone and the alternating vertical rib structure.

Polyethylene is an expensive material and is manufactured by polymerizing ethylene, a material formed from petroleum, a dwindling resource.

STATEMENT OF THE INVENTION

The lawn edging of the invention is formed from a dispersion of ground-up, recycled rubber particles in a matrix resin. Millions of used tires are generated every year. They are fairly inert and do not decay when buried in land fills. They are a fire hazard when stored in sites above the ground. It is difficult to separate the steel and fabric cord from the rubber. Since the rubber is revulcanized to a cross-linked form, the rubber cannot be recovered by solution in solvent. It is not economical to degrade the long chain rubber molecules to smaller hydrocarbons by thermal or catalytic methods.

The rubber particles utilized in the lawn edging invention can be recovered from used tire carcasses by mechanical comminution of tires and separation of the fiber or metal cord from the rubber. Ground rubber particles can be sized between screens generally to particles retained by 10 mesh screens, preferably 30–40 mesh screens. The amount of rubber used in the composite lawn edging of the invention is generally from 20 to 80 percent by weight. The continuous phase binder resin is a thermoplastic polymer capable of melting to disperse the rubber particles into an extrudable mixture. The thermoplastic polymers can be a polymer of an alkylene containing 2 to 8 carbon atoms such as ethylene, propylene, butylene, hexylene and ethyl hexylene or mixtures thereof. Other suitable thermo-plastics polymers are vinyl polymers.

The mixture is extruded to form a lawn edging having a rough surface. The rough surface intensifies the frictional resistance of the buried edging reducing the tendency of the edging to creep out of the ground. The composite rubber-polymer lawn edging is much more flexible, pliable and bendable than an equivalent polyethylene edging. It can be bent into tighter radii to follow contours of garden beds without cracking or kinking. It can also be wound into tighter spirals to make smaller packages requiring less shelf space.

The invention also relates to a unique process for extruding the lawn edging. The lawn edging preferably contains an anchoring means provided at the mid section of the vertical flange of the edging. Prior devices used inverted V-shaped lips for this purpose. In the invention, wave-like protrusions are formed on the flange protruding normal to the axis of the flange. By controlling the pressure of the extrudate entering the central section of the die, pressure on the extruded material in this section is found to periodically build up and release to form wave-like structure corresponding to the die opening and which forms alternating protrusions and dimples in the wall of the flange. The other side has a horizontal edge and may run across the top edge of the wave structure.

The lawn edging of the invention contributes to the environment by using a recycled product that otherwise would accumulate and degrade the environment. The lawn edging of the invention is more flexible than prior products, can be installed with less force, can be bent into tighter radii and has less tendency to come out of the ground after installation.

These and many other features and attendant advantages of the invention will become apparent as the invention becomes better understood by reference to the following detailed description when considered in conjunction with the accompanying drawings.

DESCRIPTION OF THE INVENTION

Figure 1:
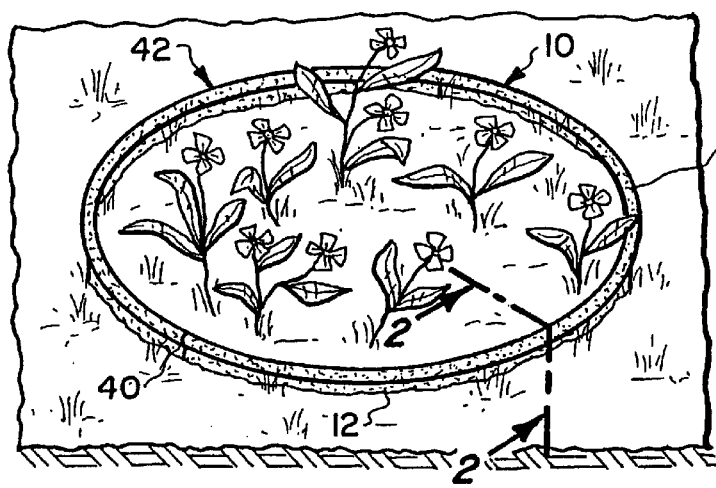
FIG. 1 is a schematic view of the lawn edging of the invention installed as a barrier around a flower bed.
Figure 2:
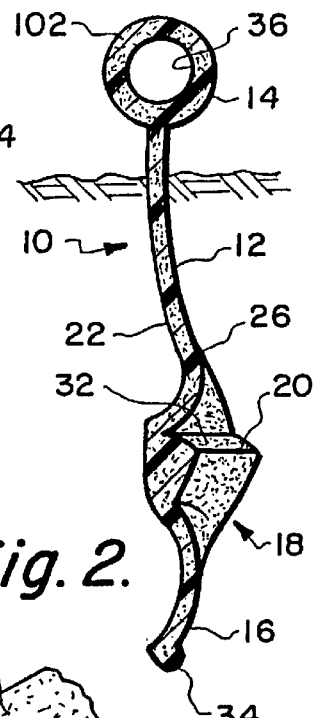
FIG. 2 is a view in section taken along line 2—2 of FIG. 1.
Figure 3:
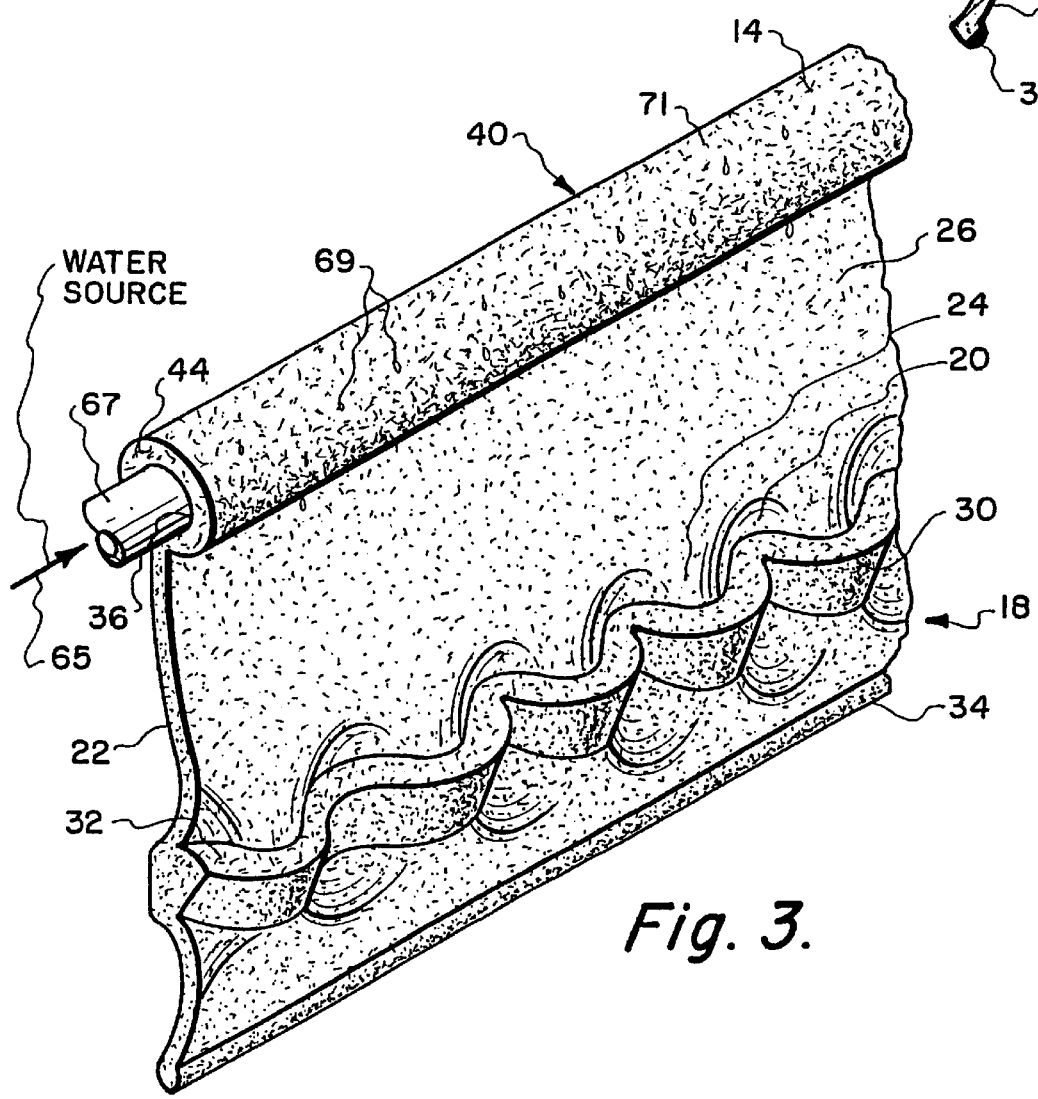
FIG. 3 is a perspective view of a length of lawn edging of the invention.

Referring now to FIGS. 1–3, the lawn edging 10 of the invention is formed of a vertical flange 12 having an enlarged head portion 14, a bottom edge 16 and an intermediate anchoring section 18. A series of spaced arcuate like protrusions 20 can be formed on a first side 22 of the flange 12. The protrusions 20 are separated by indented dimples 24. The second side 26 of the flange 12 can contain a wavy line 30 having a triangular section with a horizontal ledge 32. The ledge 32 when loaded with backfilled dirt will prevent lifting of the edging 10 out of the ground. The arcuate protrusions 20 and dimples 24 also contribute to anchoring the edging in the ground.

The bottom edge 16 of the edging 10 can contain a sharpened form, a flat form, or a cylindrical bead 34. The enlarged head portion 14 is preferably hollow containing a cavity 36 which can receive a joining rod, not shown, for joining ends 44 of the sections 40 to form elongated barriers or enclosed rings 42 as shown in FIG. 1.

Figure 4:
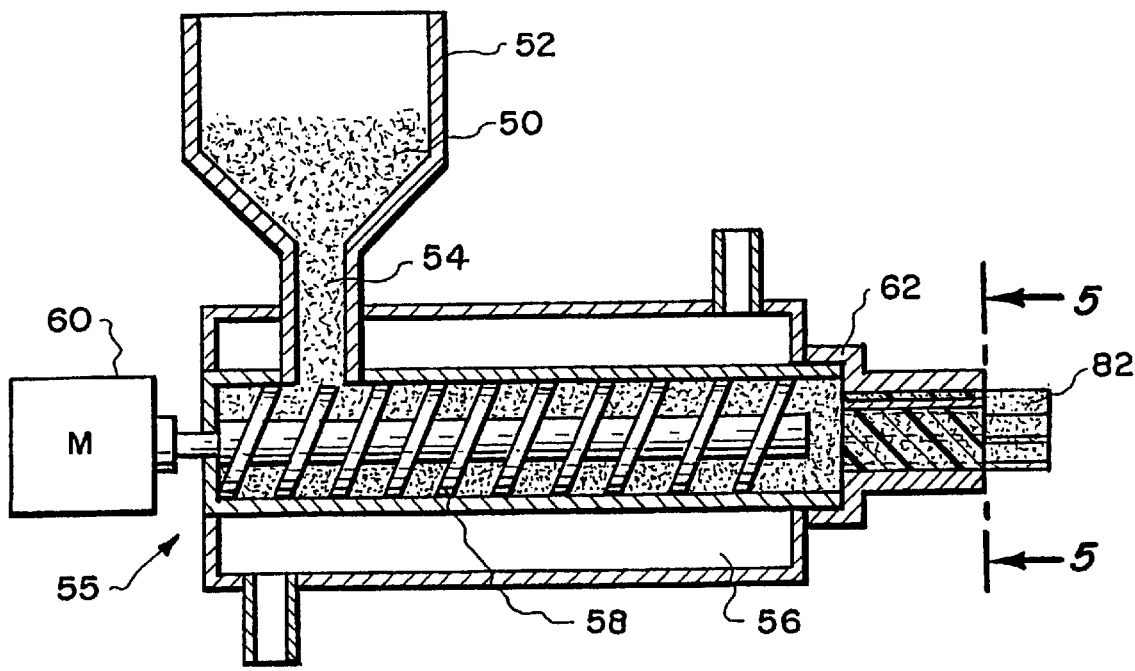
FIG. 4 is a schematic view partly in section, of an extruder system for use in forming the lawn edging of the invention.
Figure 5:
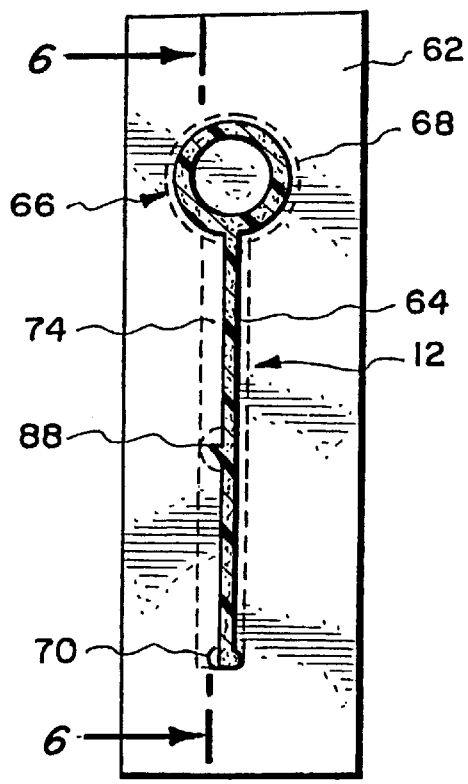
FIG. 5 is a view in section taken along line 5—5 of FIG. 4.
Figure 6:
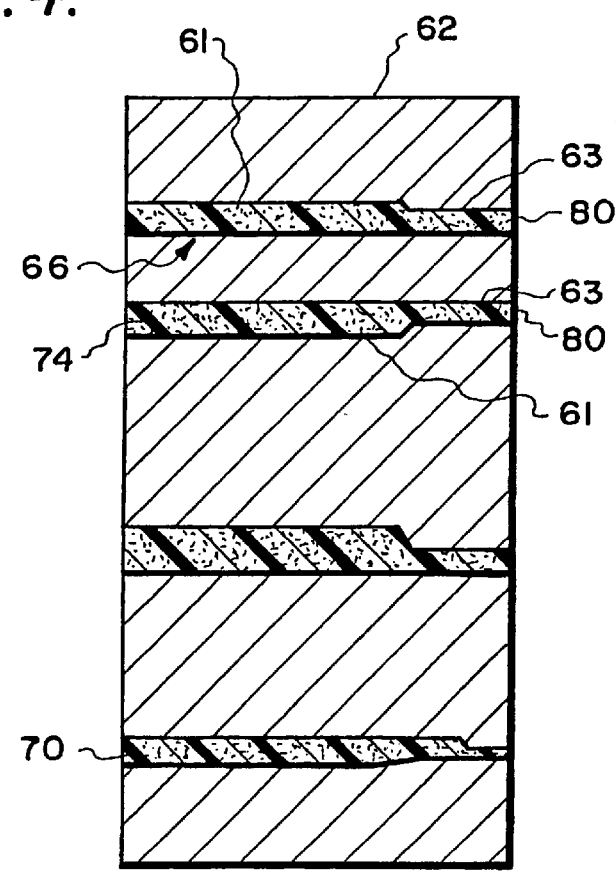
FIG. 6 is a view in section taken along line 6—6 of FIG. 5.

The lawn edging 10 is manufactured as a unitary, single article by extrusion. Referring now to FIGS. 4–6, a mixture 50 of particles of prevulcanized rubber and matrix resin such as polyethylene pellets are fed from hopper 52 into the inlet 54 of an extruder 55, preferably, a twin screw, vented extruder. The extruder can be heated by an external heating jacket 56 to a temperature at which the matrix resin melts, usually from 360° F. to 400° F. for polyethylene matrix resin. The rubber particles disperse in the molten matrix resin as the mixture advances as the screw 58 is rotated by the motor 60.

The mixture enters die 62. The die 62 has elongated vertical channels 64 for forming the flange 12, a large annular cylindrical channel 66 for forming the hollow pipe-like structure 68, a small circular channel 70 for forming the lower cylindrical head 34, and an intermediate channel 74 for forming the means for anchoring the lawn edging in the ground.

The channels 66, 70, 74 each have a front section 61 joined to a narrowed section 63 which terminate in the extrusion orifice 80 of the die 62. The ratio of the diameter of the first section 61 to the second section 63 in the intermediate channel 74 is larger than the ratio of the diameter of the first section 61 to the second section 63 in the channels 66 and 70, such that at a given extruder speed and pull rate, the extrudate 82 accumulates in the first 61 section of the intermediate channel, builds up pressure and intermittently extrudes through second section 63 past the triangular structure 88 in the orifice 80 of the die 62. The triangular band 30 is formed on one side of the flange 12 which undulates across the alternating protrusions 20 and dimples 24 as shown in FIG. 3.

The die 62 is separately heated to a temperature from 360° F. to 380° F. After the hot extrudate 82 leaves the orifice of the die 62, it is cooled in a bath of cold water before being wound up on a take-up reel, not shown.

The binder resin is a thermoplastic material capable of softening at a temperature below about 300° F. during extrusion. The resin must be stable to long term exposure to soil environment and to fertilizers, herbicides, or pesticides seeping into the adjacent soil or to fertilizers, growth regulators herbicides or pesticides. The resin must be inert to the other components of the edging such as the crumb rubber under extrusion conditions. Polyvinyl acetate is excluded from use since it will react with the crumb rubber. Styrene polymers including impact polystyrene copolymers are useful as are linear polyamides such as various Nylons, polyvinylchloride, polypheneylene oxide and polypheneylene sulfide polymers.

The most preferred group of polymers are the linear polymers of alkenes of 2 to 4 carbon atoms such as polyethylene, polypropylene, or polybutene. These polymers are unreactive in soil and in the extrusion barrel and have long segments of linearity providing crystal-line behavior. Polyethylene have lower melting temperatures, are tougher and hold shape better. High density polyethylene have densities from about 0.94 to about 0.97 gm/cc. Lawn edging prepared with all high density polyethylene binder are somewhat stiff, brittle and difficult to extrude. Lawn edgings prepared using low density polyethylene have densities from about 0.90 to 0.93 gm/cc, and lawn edging prepared with all low density polyethylene binder are very flexible and can readily be bent to follow a desired path and are readily extruded. The polyethylene can be used in any commercial form such as powder, flake or pellets. Reclaimed poly-ethylene materials can also be used. The form and color of such materials have little effect upon the product. Particles of ground rubber from tires or other sources are commercially available.

EXAMPLE

A lawn edging was prepared from a mixture of 50 percent by weight of 30 mesh vulcanized rubber particles from tires and 50 percent linear, low density polyethylene pellets. The particles and pellets were mixed. The mixture was fed to a vented twin screw extrude heated to a temperature of 380° F. The die was heated to a temperature from 360° F. to 380° F. As the mixture was extruded through a die orifice as shown in FIG. 5, lawn edging as depicted in FIGS. 2 and 3 was extruded.

The lawn edging was tested for bending and was substantially more flexible than commercial polyethylene lawn edging. The composite lawn edging was easily planted into a curved trench and showed no tendency to creep up out of the ground.

Figure 7:
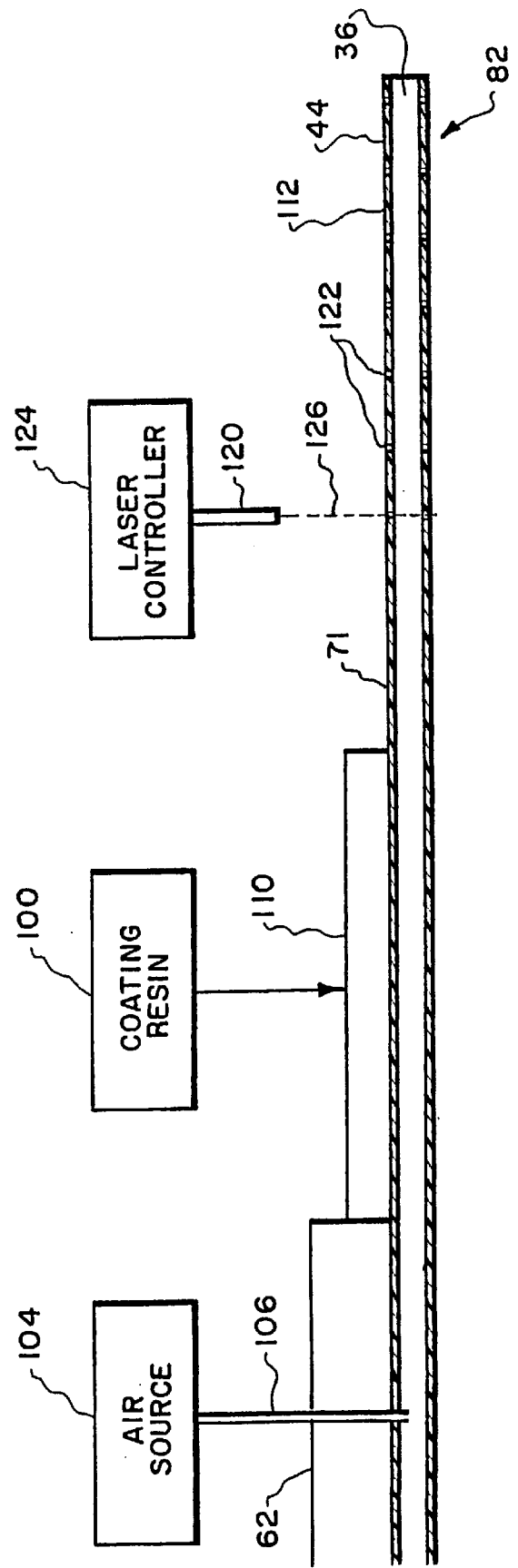
FIG. 7 is a schematic view of post extrusion operations to modify the lawn edging of the invention.

Further aspects of the invention are illustrated in FIG. 7. The lawn edging 10 formed from a rubber-thermoplastic resin is usually porous. Since the enlarged head 14 can be in hollow pipe form, it can be used as a drip emitter. When fitting 67 is connected to the orifice 36 and to high pressure water from a source 65, the head 14 will expand slightly and water drops 69 drip from the outside surface 71 of the head.

The hollow head can also be modified to form a hose impervious to water or one containing apertures for spray irrigation. Referring again to FIG. 7, the extrudate 82 is coated with a continuous film 100 of thermoplastic resin such as polyethylene in sufficient thickness to seal the surface 71 of the head 14 by feeding the extrudate through a second die 110 containing an annular orifice 112 for applying the film 110 coating of resin to the surface 71 of the lawn edging 10. The film 110 could also be applied by spraying resin onto the surface 71 or by dipping the extrudate in a bath of resin. An orifice could also be added to the die 62 to apply the coating 110. The capability to apply a separate film to the head permits inclusion of dyes and pigments in the coating. Two-colored lawn edgings have been enthusiastically accepted by the consuming public. The color of the head of the edging can be matched and coordinated with the color of buildings in the vicinity of the lawn edging.

The head 14 with liquid impervious coating 100 can also be readily converted into a spray hose. As shown in FIG. 7, at least one laser 120 mounted downstream from the die 110 can be used to form perforations 122 through the wall 44 of the hollow head 14. The laser is pulsed by a power-controller 124 to form a narrow, collimated beam 126. When the perforated hose is connected to a high pressure water source sprays of water will emit from the perforations on one and/or more sides of the head 14 depending on the location of the perforations.

The cavity 36 in the sealed head can be used to transmit water. A hollow connector, not shown, should be used to connect lengths of edging 10.

The thickness and uniformity of the wall 44 of the hollow head 14 can be improved by injecting air from air source 104 through injector 106 into the hollow section 36 while the extrudate 82 is in the die 62.

It is to be realized that only preferred embodiments of the invention have been described and that numerous substitutions, modifications and alterations are permissible without departing from the spirit and scope of the invention as defined in the following claims.

What is claimed is:

1. A lawn edging comprising:
    an elongated channel having an upper section for extending above the ground and a lower section to be disposed within the ground, said channel having a top edge and a lower edge;
    said lower section including anchor means connected to a surface of the lower section for anchoring the channel in the ground; and
    said channel being formed of a composite of 40 to 70% by weight of prevulcanized elastomer granules dispersed in a thermoplastic binder resin.

2. A lawn edging according to claim 1 in which the elastomer particles are recovered from rubber tires and the resin is polyethylene.

3. A lawn edging according to claim 1 in which the anchor means is disposed between said edges.

4. A lawn edging according to claim 3 in which the anchor means include a plurality of protrusions disposed on a surface of a sidewall within the lower section.

5. A lawn edging according to claim 4 in which the anchor means comprises a protrusion having a ledge perpendicular to a surface of the lower section.

6. A lawn edging according to claim 1 in which the lawn edging further contains a continuous head member connected to said top edge.

7. A lawn edging according to claim 6 in which the head member is hollow.

8. A lawn edging according to claim 7 in which the head member contains a liquid impervious coating of resin.

9. A lawn edging according to claim 8 in which the coating contains dyes and/or pigments to color the head member a different color than the rest of the lawn edging.

10. A lawn edging according to claim 8 in which the head member contains a plurality of perforations through said coating and adjacent wall of the head member into the hollow interior of the head member.

11. A lawn edging according to claim 1 further including a continuous bead attached to the lower edge of the channel.

12. A method of forming lawn edging comprising the steps of:
    extruding a thermoplastic resin through a die to form a channel comprising a wall with a top edge and bottom edge and an upper section and a lower section;
    disposing within the die an element to form protrusions in the wall of the lower section;
    extruding said resin through said die past said element to form protrusions in said wall; and
    which the feed rate of resin to the die element being greater than the resin feed to other portions of the wall.

13. A method according to claim 12 in which the forming element contains a surface perpendicular to the wall of the channel whereby a ledge protrusion, perpendicular to said wall is formed on extrusion.

14. A method according to claim 12 further including the step of forming a head member comprising a hollow pipe extrusion connected to said top edge.

15. A method according to claim 14 further including the step of coating said head member with a water impervious film.

16. A method according to claim 15 comprising the step of perforating said head member.

17. A method according to claim 14 further including the step of injecting gas into the interior of said head member while it is in the extrusion die.

* * * * *